(12) United States Patent
Smith et al.

(10) Patent No.: US 7,219,735 B2
(45) Date of Patent: May 22, 2007

(54) PACKER FLUID

(75) Inventors: Clayton Smith, Edmonton (CA); Dan Skibinski, Calgary (CA)

(73) Assignee: Innovative Chemical Technologies Canada Ltd., Calgary, Alberta (CA)

( * ) Notice: Subject to any disclaimer, the term of this patent is extended or adjusted under 35 U.S.C. 154(b) by 267 days.

(21) Appl. No.: 10/695,916

(22) Filed: Oct. 30, 2003

(65) Prior Publication Data

US 2004/0087448 A1     May 6, 2004

Related U.S. Application Data

(60) Provisional application No. 60/430,686, filed on Dec. 4, 2002, provisional application No. 60/422,886, filed on Nov. 1, 2002.

(51) Int. Cl.
*E21B 36/00* (2006.01)
*E21B 43/00* (2006.01)
*B65D 85/02* (2006.01)
*C09K 8/00* (2006.01)

(52) U.S. Cl. .............. 166/305.1; 166/302; 166/901; 206/303; 206/524.1; 507/203; 507/235; 507/237; 507/239; 507/240; 507/242; 507/261; 507/265; 507/266; 507/267; 507/269

(58) Field of Classification Search .............. None
See application file for complete search history.

(56) References Cited

U.S. PATENT DOCUMENTS

| | | | |
|---|---|---|---|
| 3,728,277 A * | 4/1973 | Foley .......................... | 516/27 |
| 4,046,197 A | 9/1977 | Gruesbeck, Jr. et al. | |
| 4,258,791 A | 3/1981 | Brandt et al. | |
| 4,528,104 A | 7/1985 | House et al. | |
| 4,738,897 A * | 4/1988 | McDougall et al. ........ | 428/402 |
| 5,607,901 A | 3/1997 | Toups, Jr. et al. | |
| 5,807,810 A * | 9/1998 | Blezard et al. ............. | 507/103 |
| 5,837,655 A | 11/1998 | Halliday et al. | |
| 6,017,854 A | 1/2000 | Van Slyke | |
| 6,054,415 A * | 4/2000 | Gee et al. .................... | 507/103 |
| 6,080,704 A | 6/2000 | Halliday et al. | |
| 6,096,700 A | 8/2000 | Weir et al. | |
| 6,100,221 A * | 8/2000 | Poelker et al. ................ | 507/90 |
| 6,234,183 B1 | 5/2001 | Chan et al. | |

* cited by examiner

*Primary Examiner*—Michael J. Feely
(74) *Attorney, Agent, or Firm*—Sean W. Goodwin; Linda M. Thompson

(57) ABSTRACT

A packer fluid is provided for use with a wellbore fluid in an annulus or casing bore, having an aqueous portion which contains additives for preventing corrosion, microbiological activity, salt and scale deposition, and an environmentally-acceptable capping fluid which resides at a top of the wellbore to act as freeze protection and as thermal insulation in a the frost penetration layer. The additives in the packer fluid are particularly selected to exist in the aqueous additive fluid and in the wellbore fluid and to be substantially immiscible with the capping fluid and thereby prevent significant migration of the additives into the capping fluid which would compromise its environmental acceptability.

56 Claims, 3 Drawing Sheets

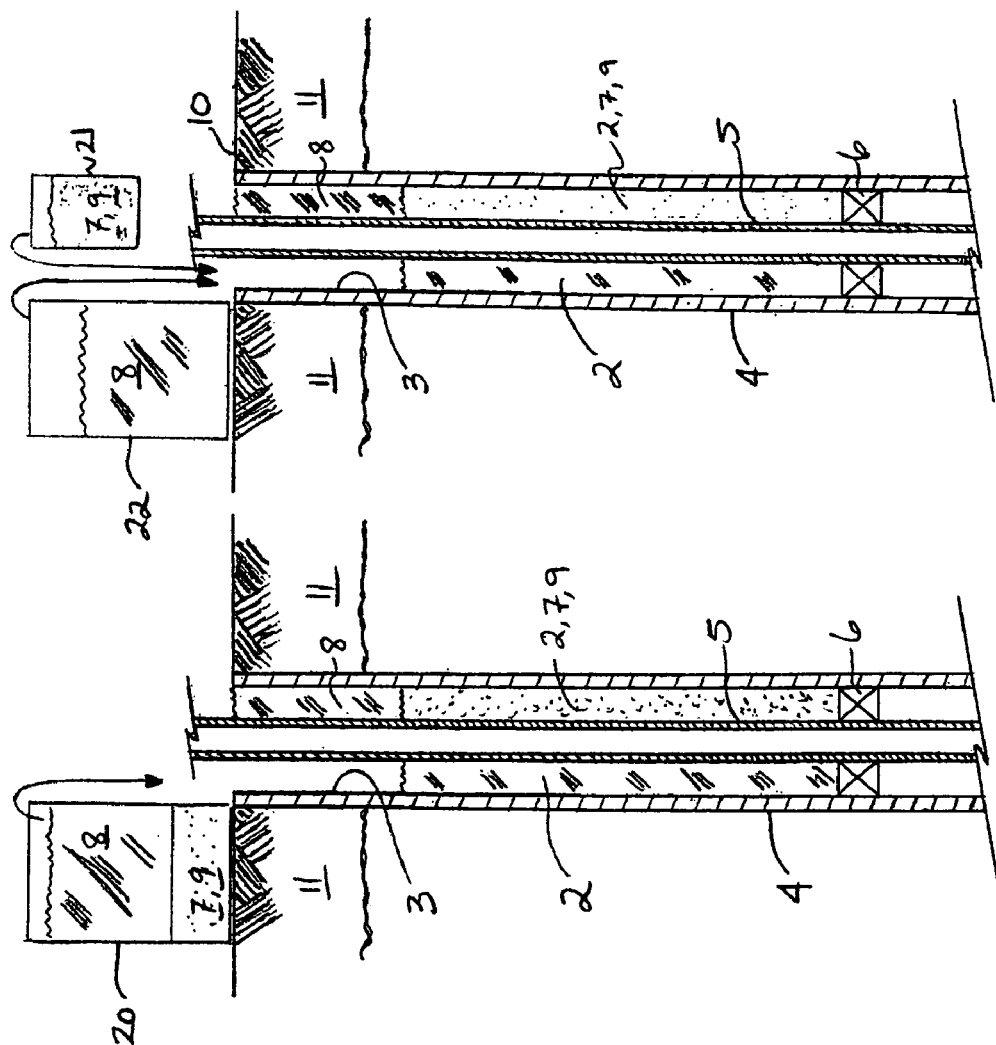

PACKER FLUID

CROSS REFERENCE TO RELATED APPLICATION

This application is a regular U.S. patent application claiming priority of pending U.S. Provisional Patent applications Ser. No. 60/422,886, filed Nov. 1, 2002 and Ser. No. 60/430,686, filed Dec. 4, 2002, the entirety of which is incorporated herein by reference.

FIELD OF THE INVENTION

The present invention relates to annular fluid compositions used to freeze-protect, thermally insulate and assist in maintaining pressure stability in a wellbore, maintaining casing and tubular integrity and more particularly, to those compositions that are environmentally acceptable.

BACKGROUND OF THE INVENTION

Annular fluids or packer fluids are liquids which are pumped into and reside in an annular space between a casing and a tubing wall, between adjacent concentric strings of pipe extending into a wellbore (casing annulus) or into the bore of a cased wellbore.

In the completion of oil and gas wells, it is currently the practice to place aqueous or non-aqueous hydrocarbon based fluids, known as packer fluids, into a casing annulus above a packer, specifically where the packer has been set to isolate production fluid from the casing annulus. Packer fluids, introduced into the casing annulus, fill the annular column to surface.

Packer fluids are used to provide both pressure stability and thermal protection to the casing annulus of production oil and gas wells as well as in injection wells. Further, packer fluids act to maintain casing and tubular integrity. The main function of a packer fluid related to pressure stabilization is to provide hydrostatic pressure in order to equalize pressure relative to the formation, to lower pressures across sealing elements or packers; or to limit differential pressure acting on the well bore, casing and production tubing to prevent collapse of the wellbore.

Typically, packer fluids are used extensively in areas which are subject to low ambient temperatures or which have significant frost penetration through which the wellbore extends. If fluids within the wellbore freeze as a result of contact with the frost layer, compressive or tension loads may be imposed, which can be sufficient to fracture the well casing and/or associated equipment such as wellhead valving and the like. Further, if sufficient heat is transferred out of the production fluids to the frost penetration layer, hydrate crystals can form within the production fluid, which can freeze together and block the bore of the string of production tubing.

It is well known, and in some cases a regulated requirement, to add a thermal capping fluid, such as diesel which is resistant to freezing and which is lighter than the in situ wellbore fluids and therefore locates adjacent the frost penetration layer at surface. Thus, thermal insulation results in the wellbore or wellbore annulus at the frost penetration layer to minimize transfer of heat from the warm production fluids within the tubing string and the frost penetration layer.

Capping fluid is commonly added on top of aqueous packer fluids which have been treated with chemical additives. In operation, chemical additives are typically added to the water or brine in a rig tank, tank or tank truck prior to being displaced downhole in the casing annulus. Diesel is then added as a layer on top of the packer fluid column to fill the annular space at the level of the frost penetration. Alternatively, additives may be added to aqueous fluids already in the annulus prior to capping with diesel. The effect of the additives can be reduced if the additives do not adequately disperse in the packer fluid and further, dispersion into the diesel layer may be enhanced.

When capping fluids such as diesel or other environmentally unfriendly hydrocarbons are used as freeze protection, they are typically the last fluids placed in the casing annulus and characteristically migrate to the top of the wellbore. Accordingly, any spillage which may occur as a result of overfilling will include capping fluid. Such accidental release may occur for a number of other reasons including: as a result of thermal expansion of fluids within the wellbore and as a result of conduction, especially on wells that have been shut in and thermally heated; during higher temperature service or where the casing may have to be opened to intervene on a well; or during packer/wellbore isolation tests. Significant damage to the surrounding environment may occur as a result of such spills. Further, the already highly toxic capping fluid may be made more toxic due to dispersion of additives from the aqueous layer upwardly into the diesel layer. Handling of these conventional capping fluids present significant risk to personnel who may be exposed either through direct contact causing absorption through the skin or breathing of toxic fumes.

Most often, during normal operation, the wellbore is filled with fluid which is typically an aqueous fluid, such as fresh water or produced brine. Fresh water or produced brine are used as they are readily available at the wellsite, however aqueous fluids are considered corrosive due to their inherent composition. As a result of brine content, dissolved gases or the presence of microbiological agents, aqueous fluids can pose a significant risk to carbon steel equipment, such as conventional tubulars and casing, with which they come into contact.

As previously introduced, it is well known to add chemical additives in various concentrations to reduce, or eliminate any or all of the above mentioned types of activity. Additives of various types and chemistry are currently added to aqueous packer fluids. The purpose of these additives is to address the problems that can occur from the use of aqueous fluids in the annular space between the casing and the production tubing in completed oil and gas wells. Some of these additives include aqueous corrosion inhibitors, scale inhibitors, salt inhibitors, oxygen scavengers, non-emulsifiers and biocides. The additives may be added to either fresh or produced waters as well as to some non-aqueous hydrocarbon-based packer fluids, which may contain residual amounts of water. Use of chemicals prolongs the mechanical integrity of cased wellbores including production tubing strings and the casing annulus.

Typically fluids are selected and used for convenience of use, economics, availability, and industry acceptance. Such fluids, except in the case of untreated fresh $H_2O$, can present significant ecological challenges and possibly affect wellbore integrity depending upon the additives used. Many additives, though able to effectively negate corrosion and bacterial problems, act to render the prior art packer fluids more environmentally unfriendly than they were as merely saturated brine.

Others have attempted to improve environmental acceptability of packer fluids. U.S. Pat. No. 5,607,901 to Toups Jr. et al. teaches a thixotropic insulating fluid comprising an environmentally acceptable non-aqueous, continuous phase fluid which is non-corrosive. The mixture contains a polar organic solvent, a hydrophilic clay and a liquid non-aqueous, non-corrosive liquid which must be combined and mixed at the wellsite for a significant period prior to addition to the wellbore annulus. Toups Jr. et al. are concerned only with providing thermal insulation to the wellbore and do not contemplate additives to combat corrosion and the like. Applicant believes that any additives added to the fluid of Toups et al. would be dispersed throughout the fluid and to the surface and would therefore render the fluid environmentally unacceptable and hazardous to personnel.

Ideally, liquids used as packer fluids should have sufficient specific gravity to enable pressure stabilization of the producing formation, be solids free, resistant to viscosity changes over periods of time, and compatible with both wellbore and completion components and materials. Further, the fluid should be environmentally acceptable so as to minimize damage during use. The fluid should be economical and easily handled to effect cost savings in rig time and associated services, as well as chemical additive costs.

SUMMARY OF THE INVENTION

The packer fluid of this invention, once placed in a wellbore, provides thermal insulation and pressure stabilization to the wellbore while meeting environmental standards acceptable to both land, and human contact. Typically the wellbore is cased and fit with a tubing string. Additives to prevent corrosion of the casing and tubing are added to an aqueous additive fluid and are applied in conjunction with a non-toxic capping fluid which is less dense than the additive fluid. The additives are particularly selected from conventional additives to be miscible in the aqueous additive fluid and usual wellbore fluids, such as water or produced brine, but at the same time are substantially immiscible with the capping fluid. Thus, when the mixture is dispensed into the wellbore fluid, the additive fluid and wellbore fluid mix and the additives disperse therein while the capping fluid, which locates or situates adjacent the surface at a potential frost penetration zone as a result of density separation, maintains environmental acceptability, resisting dispersion of the additives therein.

The additive fluid containing the additives and the capping fluid can be dispensed into the wellbore as a unitary packer fluid combined for addition to the fluids already in the wellbore, can be added separately to the wellbore fluid or can be added to a tank of fluid at surface and pumped into the wellbore with the wellbore fluid. The product of the invention provides a cost effective, environmentally conscious, and safe application of packer fluids. Further, the packer fluid can be provided to operators in a kit form, the components of which can be simply added to wellbore fluids, either as a single mixed fluid or as separate components to achieve the advantages listed herein.

In a broad aspect, the packer fluid of the present invention comprises an aqueous additive fluid adapted for addition to a wellbore fluid; and a non-toxic, environmentally acceptable capping fluid capable which does not freeze adjacent the frost penetration layer. The additive fluid and capping fluid have different densities, the capping fluid being lighter than the additive fluid and the wellbore fluid so as to locate adjacent a top of the wellbore. The additive fluid is miscible with the wellbore fluid and contains additives, being at least a corrosion inhibitor. The additives are dispersible within the additive fluid and the wellbore fluid; the capping fluid being substantially immiscible with the additive fluid and the wellbore fluid; and the additives in the additive fluid further being substantially immiscible with the capping fluid.

In a preferred embodiment of the invention the capping fluid is selected from a group of non-toxic, environmentally acceptable fluids comprising: synthetically cracked hydrocarbon fluids, natural oil bases e.g. tall-oils, corn oil, canola oil, glycerins etc.; a liquid selected from the group of esters, polyalpha olefins, ethers, food-grade paraffins and linear alpha-olefins, glycols and polyglycols; non-toxic silicone oils; mineral oils; linear alcohols (ethoxylated or not); non-toxic condensate or fracturing fluids and natural oils and mixtures thereof.

The aqueous additive fluid contains specifically selected additives being at least anti-corrosive agents to provide adequate corrosion mitigation of the aqueous annular fluid or wellbore fluid. Further, the additives may include biocidal agents which efficiently retard any biological activity that could occur as a result of the temperature and stagnant conditions that exist above the packer. Additional additives may comprise at least some of scale inhibitors, salt inhibitors, oxygen scavengers, and non-emulsifiers

BRIEF DESCRIPTION OF THE DRAWINGS

FIG. 2 is a partial cross-sectional schematic of one embodiment of the invention according to FIG. 1 wherein the packer fluid is packaged for addition to the wellbore as a unitary fluid;

FIG. 3 is a partial cross-sectional schematic of an alternate embodiment of the invention according to FIG. 1, wherein the packer fluid is packaged for addition to a wellbore fluid as an additive fluid and as a capping fluid;

FIG. 4 is a partial cross-sectional schematic of yet another alternate embodiment of the invention according to FIG. 1, wherein the additive fluid, capping fluid and wellbore fluid are combined at surface and dispensed into the wellbore as a unitary fluid.

DETAILED DESCRIPTION OF THE PREFERRED EMBODIMENT

Figure 1:
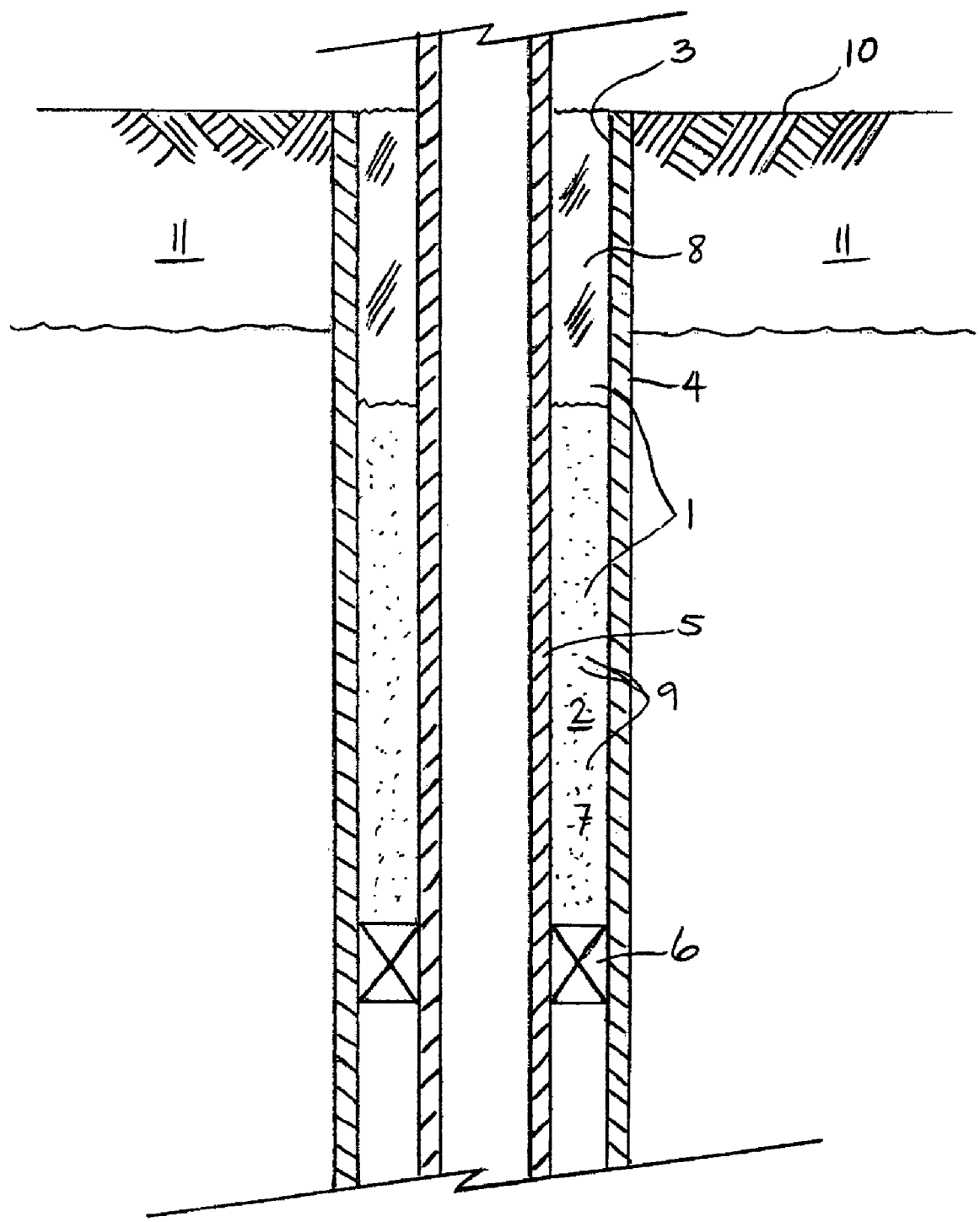
FIG. 1 is a cross-sectional schematic of a wellbore illustrating the relationship between a casing, a production tubing string, an annular space, a packer, and a packer fluid of the present invention.
Figure 5:
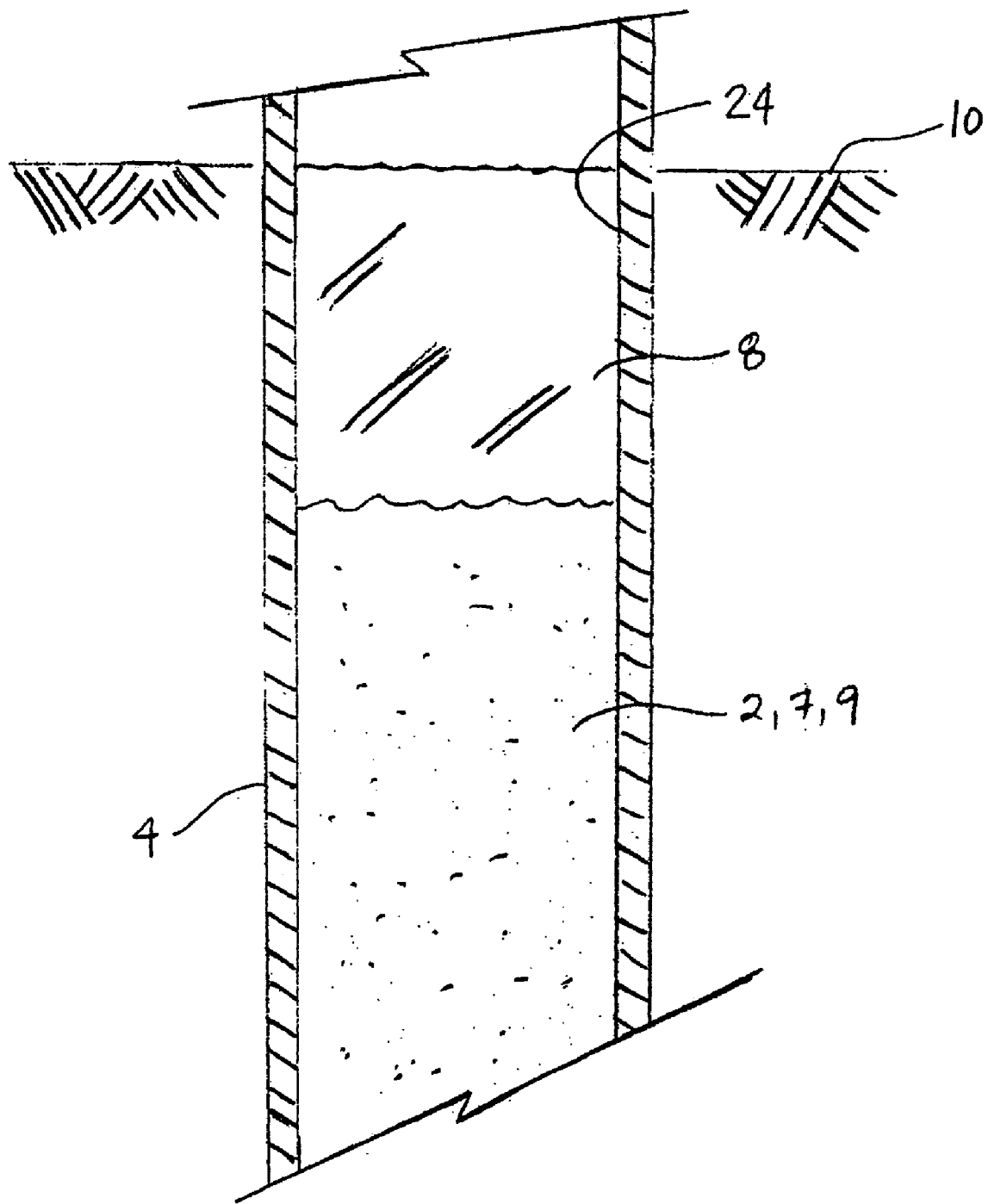
FIG. 5 is a partial cross-sectional schematic of an embodiment of the invention wherein the packer fluid is added to wellbore fluid in a cased wellbore having no tubulars therein.

As shown in FIGS. 1–5, a packer fluid 1 is provided for addition to a wellbore fluid 2, typically aqueous or produced brine, which resided within or is placed into a wellbore. A wellbore includes a wellbore casing 4 and internal components therein including a production tubing 5. In the case of the presence of production tubing 5, wellbore fluid resides in an annulus 3 formed between the casing 4 and the production tubing 5. Typically wellbore fluid is retained in the wellbore or annulus by a wellbore packer 6 (FIGS. 1–4). As shown in FIG. 5, in the absence of the production tubing 5, wellbore fluid resides in the casing 4 alone.

The packer fluid 1 comprises an additive fluid 7 that is miscible with the wellbore fluid 2, and a capping fluid 8 that is substantially immiscible with both the wellbore fluid 2 and the additive fluid 7. Additives 9, added to the additive fluid 7, are selected from conventional additives to be miscible and dispersible into the additive fluid 7 which is typically an aqueous fluid, miscible and dispersible the wellbore fluid 2, and substantially immiscible in the capping fluid 8.

The capping fluid 8 is a non-toxic, environmentally acceptable fluid, having a density lower than the wellbore and additive fluids 2,7 so as to employ gravity separation to locate or situate the capping fluid 8 adjacent surface 10 at a top of the wellbore. Accordingly capping fluid 8 is adjacent any underlying frost penetration layer 11 to provide freeze protection and thermal insulation to a drilling string or production tubing 5.

Additives are typically environmentally unfriendly and it is desirable to exclude them from the fluid closest to the surface 10. The additives 9 are particularly selected so as to be substantially non-dispersible and immiscible with the capping fluid 8. Thus, the portion of the packer fluid 1 that is closest to the surface 10 maintains environmental acceptability in case of a spill, the environmentally unacceptable additives 9 being found in toxic concentrations only in the lower wellbore/additive fluid portion 2,7 spaced downhole from surface 10.

In a preferred embodiment of the invention as shown in FIG. 2, the packer fluid 1 is provided as a unitary package 20 wherein the additive fluid 7, additives 9 and capping fluid 8 are pre-packaged together as a single fluid for dispensing into the wellbore fluid 2 in the casing annulus 3. As can be appreciated by those skilled in the art, the capping fluid 8 and additive fluid 7 exist separately within the package 20 or drum-like container, as a result of the density differentials, and the additives 9, being substantially immiscible with the capping fluid 8 remain almost exclusively in the additive fluid 7.

In another embodiment, as shown in FIG. 3, while it is advantageous to provide the components as a single product in a single package 20, it can be appreciated by those skilled in the art that the constituents of the packer fluid 1 invention can also be supplied and applied separately. A first fluid 21 is provided comprising the additive fluid 7 containing the additives 9, being at least a corrosion inhibitor and packaged in a separate package or drum. A second fluid 22 is provided comprising the capping fluid 8. The first and second fluids 21,22 are added directly to the casing annulus 3 containing existing wellbore fluid 2. The additive fluid 7 and the additives fall through the wellbore fluid 2 column to blend with the wellbore fluid 2, regardless of the salinity of the wellbore fluid, the additives 9 dispersing therein. The capping fluid 8, resides or rises to the top of the casing annulus 3 to rest adjacent the surface 10 and the frost penetration layer 11.

Alternatively, in the case of a non-aqueous wellbore fluid, the packer fluid 1 can also be used to prevent corrosion of the casing 4 and components resulting from residual water which may remain in the existing fluid. In these instances, the thermal properties of the capping fluid 8 are typically not required however, environmental acceptance is still preferred.

In yet another embodiment of the invention, as shown in FIG. 4, wellbore fluid 2, additive fluid 7, additives 9 and capping fluid 8 are combined in a large tank 23 or tanks at surface and are pumped into an empty casing annulus 3 or casing 4. As will be appreciated, the capping fluid separates due to the density differentials; the additive fluid 7, wellbore fluid 2 and additives 9 being blended and remaining separate from the capping fluid 8, initially in the tank 23 when at rest and again in the casing annulus 3.

As shown in FIG. 5, for particular use in the case of an abandoned or otherwise inactive well, suspended for future production or injection, the production tubing 5 is removed from the wellbore casing 4 and the entire casing bore 24 is filled with fluid containing the packer fluid 1 of the present invention which provides a wellbore environment satisfactory to meet regulatory requirements such as those set by the Government of Alberta, Energy and Utilities Board (EUB), Interim Directive ID 90-4.

The packer fluid 1 of the present invention may contain a variety of additives 9 including for corrosion inhibition, scale inhibition, oxygen scavation, emulsion inhibition and biocidal control. Individual additives 9 are selected for inclusion into the packer fluid 1 so as to ensure maximum dispersion in the additive fluid 7 portion with no appreciable dispersion in the capping fluid 8. For this reason, the selected additives 9 differ from those used in many prior art packer fluids, avoiding such as conventional quaternary ammonium chlorides and other molecules with long fatty chain structures which would have a high dispersion into the capping fluid 8 and which are typically toxic. Further, the packer fluid 1 of the present invention avoids the use of heavy metal technology, previously used in weighted packer inhibitors, to improve safety of handling.

The capping fluid 8 is a non-aqueous fluid, immiscible with aqueous fluids, having a pour point between −100° C. and 0° C. and a density less than 1.0 g/L. While not limiting, the capping fluid is selected from a group of non-toxic, environmentally acceptable fluids comprising synthetically-cracked hydrocarbon fluids, natural oil bases such as tall-oils, coconut oil, canola oil, corn oil, peanut oil and mixtures thereof, glycerins and the like, esters, polyalpha olefins, ethers, food-grade paraffins and linear alpha-olefins, glycols and polyglycols, non-toxic silicone oils, mineral oils, ethoxylated or non-ethoxylated linear alcohols and non-toxic condensate or fracturing fluids and mixtures thereof.

For a typical wellbore, and in a preferred embodiment of the invention, the capping fluid is provided in a suitable volume to provided freeze protection and insulate any internal components from the frost penetration layer. A suitable volume of capping fluid is about 60 L for use in conventionally sized casings with or without conventionally sized tubulars located therein. The capping fluid is preferably a synthetically-cracked hydrocarbon fluid. More preferably the capping fluid is ENVIRO-DRILL™, a hydrotreated heavy petroleum naphtha, available from Innovative Chemical Technologies Canada Ltd, Edmonton, Alberta, Canada.

The aqueous additive fluid 7 portion, being the balance of the total volume of the packer fluid, is provided in a volume calculated for wellbores having conventionally sized casings with or without conventionally sized tubulars therein and having a variety of depths, and contains at least an anti-corrosive agent to provide adequate corrosion mitigation of the aqueous wellbore fluid. Typically, the additive fluid is calculated to provide about 0.05 L per meter of wellbore depth and can vary with wellbore fluid content.

Further, the additive fluid portion 7 may contain one or more of biocidal agents, which efficiently retard any biological activity that could occur as a result of the temperature and stagnant conditions that exist above the packer, scale inhibitors, salt inhibitors, oxygen scavengers and non-emulsifiers.

Typically, the corrosion inhibitors are selected from a group of anti-corrosion inhibitors that are immiscible and non-dispersible in the capping fluid 8 selected. The corro sion inhibitors are preferably selected from the group of corrosion inhibitors having the following structures:

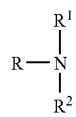 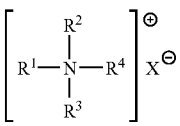

Where R = H, Alkyl or Aryl
R¹ = H, Alkyl or Aryl
R⁴, R³, R² = H, Alkyl or Aryl

X⁻ = balancing anionic salt
Example: chloride, carbonate etc.

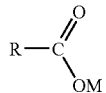 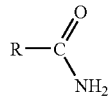

Where M = Alkyl/Aryl alcohol
Alkyl/Aryl Amine
Hydrogen

While not limiting, in a preferred embodiment, the group of suitable corrosion inhibitors comprises primary, secondary and tertiary amines, fatty acid amides, non-toxic quaternary ammonium compounds, imidazoines or imidazolium salts, alkylpyridines, long chain fatty acids and their salts and mixtures thereof.

The corrosion inhibitor is preferably an alkali-metal salt of a long chain fatty acid and most preferably, is an amine salt of a long chain fatty acid. Examples of such suitable corrosion inhibitors are TENAX 2010, available from Westvaco Chemical Division, South Carolina, USA and Witco DTA 350 available from Crompton Corporation, Middlebury, Conn., USA. Typically, the corrosion inhibitors are neutralized using ethyleneamine such as diethylenetriamine, available from Huntsman ICI Chemicals LLC, Salt Lake City, Utah, USA.

The scale inhibitor is preferably selected from a group comprising of alkali-metal and alkali—earth metal phosphates, carboxylic acids and carboxylic acid salts, and inorganic and organic phosphate esters and phosphates, maleic acid polymer, polymaleic acid copolymers, polymaleic acid terpolymers, phosphino carboxylic acids, sulphonated phosphino carboxylic acids, sulphonated phosphono carboxylic acids, sulphonated polyphosphino carboxylic acids, sulphonated polyphosphono carboxylic acids, acrylic acid polymers and alkyl epoxy carboxylates and mixtures thereof. The scale inhibitor comprises from about 0% to about 5% by weight.

A suitable scale inhibitor is a phosphorus-containing compound, having the general formula:

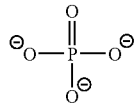

Preferably the scale inhibitor is a phosphonate, selected from a group having the following structural formulae:

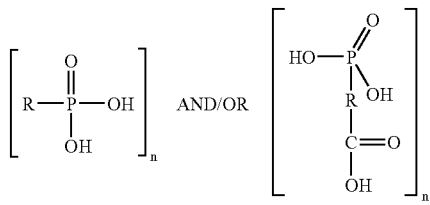

Where: R=H, Alkyl or Aryl
N=integer from 1–10

Preferably the scale inhibitor is a phosphonate chosen from aminotrimethylenephosphonic acid (ATMP), hydroxyethylidene diphosphonic acid (HEDP), diethylene triamine pentamethylene phosphonic acid (DETPMP), bishexamethylene triaminephosphonic acid (BHMT) and bisaminoethylethanolamine phosphonic acid (BAEE) and mixtures thereof. The scale inhibitor is most preferably BHMT.

While not limiting, the salt inhibitor is selected from a group comprising non-ionic surfactants such as nonyl/octyl phenols and linear alcohol ethoxylates, demulsifiers and glycols and polyglycols and comprises from about 0% to about 5% by weight.

The salt inhibitor is preferably a non-toxic surfactant and is most preferably a nonyl phenol ethoxylate or a linear alcohol ethoxylate. One such salt inhibitor is TERGITOL NP-9™, available from Dow Chemicals, Canada.

The oxygen scavenger is selected from a group comprising alkali or alkali-earth metal sulphites, alkali or alkali-earth metal bisulphites, ammonium bisulphite, diethylhydroxylamine, hydrazine and methyl ethyl ketoxime and comprises from about 0% to about 10% by weight.

The oxygen scavenger is preferably a bisulphite solution and is most preferably a catalyzed sodium bisulphite solution.

The biocidal component is selected from a group comprising bromonitrophenols, phosphonium sulphates, KATHON™ (containing methylchloroisothiazolinone and methylisothiazolinone, available from Rohm & Haas Co, USA), hypochlorite, ethoxylated amines, and ether amines. The biocide comprises from about 0% to about 5% by weight.

The biocidal component is preferably a phosphorus containing compound and is most preferably a Tetakishydroxymethyl phosphonium sulphate (THPS) solution.

The demulsifier is selected from the group consisting of resin oxylalkylate, diepoxide and alkyl polyol and comprises from about 0% to about 10% by weight. One such demulsifier is ARBREAK 82™, available from Baker Petrolite, Canada, as a proprietary formulation.

EXAMPLE 1

In an embodiment of the invention, the packer fluid comprises the constituents as outlined in Table A.

TABLE A

| Capping fluid portion | typically 60 L |
| Envirodrill (synthetically cracked hydrocarbons) | 100% by weight |
| Aqueous additive portion | 0.05 L/m wellbore depth |

| | % by weight | Range |
| --- | --- | --- |
| Corrosion inhibitor | | (0–50%) |
| DTA-350-C18 unsaturated fatty acids, dimers | 10% | |
| Diethylene Triamine-neutralizing amine | 3% | |
| Rewoteric CAS-15 | 10.0% | |
| Demulsifier | 1.0% | (0–1%) |
| Diluent- | | |
| Propylene glycol | 36% | |
| Water | 40% | |

Final pH after neutralization with diethylene triamine is approximately 6.5–7.5.

EXAMPLE 2

In an embodiment of the invention, the packer fluid comprises the constituents as outlined in Table B.

TABLE B

| Capping fluid portion | typically 60 L |
| --- | --- |
| Envirodrill (synthetically cracked hydrocarbons) | 100% by weight |
| Aqueous additive portion | 0.05 L/m wellbore depth |

| | % by weight | Range |
| --- | --- | --- |
| Corrosion inhibitor | | (0–50%) |
| TENAX 2010 | 10% | |
| Diethylene Triamine-neutralizing amine | 3% | |
| Rewoteric CAS-15 (amphoteric surfactant) | 10.0% | |
| Demulsifier | 1.0% | (0–1%) |
| Diluent- | | |
| Propylene glycol | 36% | |
| Water | 40% | |

Final pH after neutralization with diethylene triamine is approximately 6.5–7.5.

EXAMPLE 3

In one embodiment of the invention a packer fluid is provided having the constituents as outlined in Table C:

TABLE C

| Capping fluid portion | typically 60 L |
| --- | --- |
| Envirodrill (synthetically cracked hydrocarbons) | 100% by weight |
| Aqueous additive portion | 0.05 L/m wellbore depth |

| | % by weight | Range |
| --- | --- | --- |
| Corrosion inhibitor | 25% | (0–50%) |
| (synthetic polyfunctional fatty acid salted with diethylene triamine) | | |
| Salt Inhibitor | 2% | (0–5%) |
| (9 mole nonyl phenol ethoxylate) | | |
| Scale inhibitor | 2% | (0–5%) |
| (BHMT) | | |
| Biocide | 1% | (0–5%) |
| (tetrakishhydroxymethyl phosphonium sulphate) | | |
| Diluent- | | |
| Ethylene glycol | 42% | |
| Water | 28% | |

EXAMPLE 4

In an alternate embodiment of the invention, the packer fluid comprises the constituents as outlined in Table D.

TABLE D

| Capping fluid portion | typically 60 L |
| --- | --- |
| Envirodrill (synthetically cracked hydrocarbons) | 100% by weight |
| Aqueous additive portion | 0.05 L/m wellbore depth |

| | % by weight | Range |
| --- | --- | --- |
| Corrosion inhibitor | | (0–50%) |
| DTA-350-C18 unsaturated fatty acids, dimers | 10% | |
| Diethylene Triamine-neutralizing amine | 3% | |
| Salt Inhibitor | 2% | (0–5%) |
| (9 mole nonyl phenol ethoxylate) | | |

TABLE D-continued

| Scale inhibitor | 2% | (0–5%) |
| --- | --- | --- |
| (BHMT) | | |
| Demulsifier | 0.5% | (0–1%) |
| Biocide | 3% | (0–5%) |
| Bricorr 75 | | |
| (tetrakishhydroxymethyl phosphonium sulphate) | | |
| Diluent- | | |
| Propylene glycol | 45% | |
| Water | 24% | |

EXAMPLE 5

In an alternate embodiment of the invention, the packer fluid comprises the constituents as outlined in Table E.

TABLE E

| Capping fluid portion | typically 60 L |
| --- | --- |
| Envirodrill (synthetically cracked hydrocarbons) | 100% by weight |
| Aqueous additive portion | 0.05 L/m wellbore depth |

| | | % by weight | Range |
| --- | --- | --- | --- |
| Corrosion inhibitor | | | (0–50%) |
| TENAX 2010 | (77%) | 19% | |
| Diethylene Triamine-neutralizing amine | (23%) | 6% | |
| Diluent- | | | |
| Ethylene glycol | | 37.5% | |
| Water | | 37.5% | |

Diluent and corrosion inhibitor are combined in a 75:25 ratio to form the final aqueous additive portion. The final pH after neutralization with diethylene triamine is approximately 7.0.

All disclosed embodiments of the packer fluid 1 of the present invention were tested and found to comply with Alberta Energy and Utilities Board standards G-50 environmental guidelines to determine environmental acceptability. The testing used was a Toxic Test Luminescent Bacteria, 1/RM/24 (MicroTox™) developed by Environment Canada. Prior to testing, volume appropriate quantities of capping fluid and additive fluid with additives were mixed together on an elliptical shaker for 30 minutes at 15 shakes per minute. After mixing, the mixture was allowed to stand causing the emulsion to break, and simulating wellbore conditions. A sample was taken from approximately the middle of the capping fluid portion and was subjected to MicroTox™ testing.

Further, samples of some of the preferred formulations were subjected to static corrosion testing and autoclave corrosion testing at elevated pressure and temperature in different brine concentrations. The results are shown in Tables F and G.

TABLE F

Static Corrosion Test Results

| Formulation | Brine Conc. (ppm Cl⁻) | Corrosion Inhibitor (ppm) | Temp (° C.) | Corrosion Rate (MPY) |
| --- | --- | --- | --- | --- |
| Blank | 5,000 | — | 20 | 2.2 |
| | 50,000 | — | 20 | 2.1 |
| | 100,000 | — | 20 | 1.8 |

TABLE F-continued

Static Corrosion Test Results

| Formulation | Brine Conc. (ppm Cl⁻) | Corrosion Inhibitor (ppm) | Temp (° C.) | Corrosion Rate (MPY) |
|---|---|---|---|---|
| Example 5 | 5,000 | 5,000 | 20 | 1.3 |
|  | 50,000 | 10,000 | 20 | 1.1 |
|  | 100,000 | 15,000 | 20 | 1.2 |
| Blank | 5,000 | — | 40 | 3.3 |
|  | 50,000 | — | 40 | 4.3 |
|  | 100,000 | — | 40 | 3.8 |
| Example 5 | 5,000 | 5,000 | 40 | 1.7 |
|  | 50,000 | 10,000 | 40 | 1.3 |
|  | 100,000 | 15,000 | 40 | 1.8 |
| Blank | 5,000 | — | 60 | 5.6 |
|  | 50,000 | — | 60 | 5.6 |
|  | 100,000 | — | 60 | 2.8 |
| Example 5 | 5,000 | 5,000 | 60 | 1.7 |
|  | 50,000 | 10,000 | 60 | 1.3 |
|  | 100,000 | 15,000 | 60 | 1.1 |
| Blank | 5,000 | — | 80 | 4.2 |
|  | 50,000 | — | 80 | 6.6 |
|  | 100,000 | — | 80 | 3.0 |
| Example 5 | 5,000 | 5,000 | 80 | 1.7 |
|  | 50,000 | 10,000 | 80 | 1.9 |
|  | 100,000 | 15,000 | 80 | 1.9 |
| Example 5 | 5,000 | 2,000 | 20 | 1.3 |
|  | 50,000 | 2,000 | 20 | 1.1 |
|  | 100,000 | 2,000 | 20 | 1.2 |
| Example 5 | 5,000 | 2,000 | 40 | 1.7 |
|  | 50,000 | 2,000 | 40 | 1.3 |
|  | 100,000 | 2,000 | 40 | 1.8 |
| Example 5 | 5,000 | 4,000 | 80 | 1.5 |
|  | 50,000 | 7,000 | 80 | 2.6 |
| Example 5 | 5,000 | 1,000 | 80 | 2.4 |
|  | 50,000 | 2,000 | 80 | 2.4 |

TABLE G

Autoclave Corrosion Test Results

| Formulation | Brine Conc. (ppm Cl-) | Corrosion Inhibitor Conc. (ppm) | Temp (° C.) | Pressure (PSI) | Corrosion Rate (MPY) |
|---|---|---|---|---|---|
| Example 5 | 100,000 | 2000 | 80 | 500 | 2.7 |
| Blank | 60,000 | — | 20 | 2000 | 4.8 |
|  | 60,000 | — | 40 | 2000 | 5.4 |
|  | 60,000 | — | 60 | 2000 | 8.2 |
| Example 2 | 60,000 | 5,000 | 20 | 2000 | 0.9 |
|  | 60,000 | 5,000 | 40 | 2000 | 1.1 |
|  | 60,000 | 5,000 | 60 | 2000 | 0.8 |

As disclosed, the packer fluid can be implemented in a variety of methodologies. The components can be added to existing liquid in the wellbore. The components can be combined with liquids to be introduced to the wellbore. The packer fluid components themselves can be combined before addition to a wellbore or added independently to the wellbore for achieving their own place in the system.

Preferably, the packer fluid 1 of the present invention is provided to the user in pre-proportioned packages, calculated based on well depth, tubing diameter and casing diameter. The packer fluid is pre-packaged in color-coded drums which are available for wells having an annulus being 2⅜" or 2⅞" in 4½" or 5½" casings having depths of less than 1000 meters, having approximately 60 L of capping fluid and 50 L of additive fluid; depths less than 1500 meters, having 60 L of capping fluid and 75 L of additive fluid; and depths less than 2000 meters, having 60 L of capping fluid and 100 L of additive fluid.

For larger casings, such as 7" casing, two of the appropriate color-coded drums are added to provide sufficient capping fluid 8 and additive fluid 7. For wellbores having a greater depth, the amount of additive fluid is calculated to provide approximately 0.05 L/m.

For larger dimension casing, incremental increases in additive fluid and capping fluid are also required to ensure the capping fluid is positioned to the depth of the frost penetration layer and that the additives are present in effective concentrations.

The embodiments of the invention in which an exclusive property or privilege is claimed are defined as follows:

1. A packer fluid for use in a wellbore containing wellbore fluid, the packer fluid comprising:
   in a first phase, an aqueous additive fluid adapted for addition to the wellbore fluid; and
   a non-toxic, environmentally acceptable capping fluid in substantially a second phase, wherein, the additive fluid and capping fluid having different densities, the capping fluid having a density lighter than the additive fluid and the wellbore fluid for locating adjacent a frost penetration layer adjacent a top of the wellbore, the additive fluid being miscible with the wellbore fluid, and the capping fluid being substantially immiscible with the additive fluid and the wellbore fluid; and
   additives, being at least a corrosion inhibitor, and being dispersible within the additive fluid and the wellbore fluid, and the additives in the additive fluid further being substantially immiscible with the capping fluid,
   wherein the first phase and the second phase are substantially phase separated.

2. The packer fluid as described in claim 1 wherein the additives further comprise at least one or more of a scale inhibitor, a salt inhibitor, an oxygen scavenger, a non-emulsifier and a biocide.

3. The packer fluid as described in claim 2 wherein the scale inhibitor comprises a range from 0% to about 5% by weight of the packer fluid.

4. The packer fluid as described in claim 2 wherein the salt inhibitor comprises a range from 0% to about 5% by weight of the additive fluid.

5. The packer fluid as described in claim 2 wherein the oxygen scavenger comprises a range from 0% to about 10% by weight of the additive fluid.

6. The packer fluid as described in claim 2 wherein the biocide comprises a range from 0% to about 5% by weight of the additive fluid.

7. The packer fluid as described in claim 2 wherein the non-emulsifier comprises a range from 0% to about 10% by weight of the additive fluid.

8. The packer fluid as described in claim 2 wherein the scale inhibitor is a phosphorus containing compound having the general formulae:

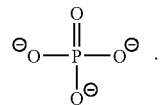

9. The packer fluid as described in claim 2 wherein the scale inhibitor is a phosphonate having the following structural formulae having the general formulae:

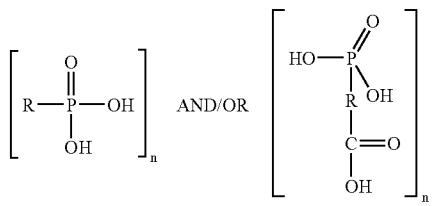

Where: R=H, Alkyl or Aryl and n=integer from 1–10.

10. The packer fluid as described in claim 2 wherein the scale inhibitor is selected from a group consisting of alkali-metal phosphates, alkali-earth metal phosphates, carboxylic acids, salts of carboxylic acids, inorganic phosphate esters, organic phosphate esters, phosphates maleic acid polymer, polymaleic acid copolymers, polymaleic acid terpolymers, phosphino carboxylic acids, sulphonated phosphino carboxylic acids, sulphonated phosphono carboxylic acids, sulphonated polyphosphino carboxylic acids, sulphonated polyphosphono carboxylic acids, acrylic acid polymers, alkyl epoxy carboxylates, and mixtures thereof.

11. The packer fluid as described in claim 2 wherein the scale inhibitor is a phosphonate.

12. The packer fluid as described in claim 2 wherein the scale inhibitor is selected from the group consisting of aminotrimethylenephosphonic acid, hydroxyethylidene diphosphonic acid, diethylene triamine pentamethylene phosphonic acid, bishexamethylene triaminephosphonic acid, bisaminoethylethanolamine phosphonic acid, and mixtures thereof.

13. The packer fluid as described in claim 2 wherein the salt inhibitor is selected from a group consisting of non-ionic surfactants, demulsifiers glycols, polyglycols, and mixtures thereof.

14. The packer fluid as described in claim 2 wherein the salt inhibitor is a nonyl phenol ethoxylate.

15. The packer fluid as described in claim 2 wherein the salt inhibitor is a linear alcohol ethoxylate.

16. The packer fluid as described in claim 2 wherein the oxygen scavenger is selected from a group consisting of alkali metal sulphites, alkali-earth metal sulphites, alkali metal bisulphites, alkali-earth metal bisulphites, ammonium bisulphite, diethylhydroxylamine, hydrazine, methyl ethyl ketoxime, and mixtures thereof.

17. The packer fluid as described in claim 2 wherein the oxygen scavenger is a catalyzed sodium bisulphite.

18. The packer fluid as described in claim 2 wherein the biocide is selected from a group consisting of bromonitrophenols, phosphonium sulphates, methylchloroisothiazolinone, methylisothiazolinone, hypochlorite ethoxylated amines, ether amines, alkyl aldehydes, aryl aldehydes, primary amines, secondary amines, tertiary amines, quaternary amines, and mixtures thereof.

19. The packer fluid as described in claim 2 wherein the biocide is tetakishhydroxymethyl phosphonium sulphate.

20. The packer fluid as described in claim 2 wherein the non-emulsifier is selected from the group consisting of resin oxyalkylate, diepoxide, alkyl polyol, and mixtures thereof.

21. The packer fluid as described in claim 1 wherein the non-toxic environmentally acceptable capping fluid is non-aqueous, immiscible with aqueous fluids, has a pour point between −100° C. and 0° C. and a density less than 1.0 g/L.

22. The packer fluid as described in claim 1 wherein the capping fluid volume is sufficient to fill a depth of the wellbore to the frost penetration layer and the additive fluid volume is calculated to provide about 0.05 L of additive fluid per meter depth of the wellbore.

23. The packer fluid as described in claim 1 wherein the corrosion inhibitor comprises a range from greater than 0% to about 50% by weight of the additive fluid.

24. The packer fluid as described in claim 1 wherein the non-toxic environmentally friendly capping fluid is selected from a group consisting of synthetically cracked hydrocarbons, esters, polyalphaolefins, ethers, food-grade paraffins, linear alpha-olefins, glycols, polyglycols, non-toxic silicone oils, minerals oils, linear alcohols, ethoxylated linear alcohols, non-toxic hydrocarbon condensates and fracturing fluids, natural oils, and mixtures thereof.

25. The packer fluid as described in claim 24 wherein the non-toxic environmentally friendly capping fluid is a synthetically cracked hydrocarbon.

26. The packer fluid as described in claim 1 wherein the corrosion inhibitor is selected from a group consisting of primary, secondary and tertiary amines, fatty acid amides, quaternary ammonium compounds, imidazoines, imidazolium salts, alkylpyridines, long chain fatty acids, salts of long chain fatty acids, and mixtures thereof.

27. The packer fluid as described in claim 1 wherein the corrosion inhibitor is selected from a group consisting of:

Where R=H, Alkyl or aryl, R$^1$=H, Alkyl or Aryl, R$^4$, R$^3$, R$^2$=H, Alkyl or Aryl;

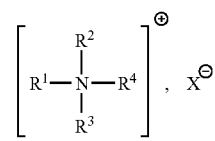

Where X$^-$=balancing anionic salt;

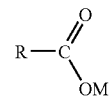

Where M=Alkyl/Aryl alcohol, Alky/Aryl Amine or Hydrogen; and

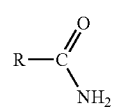

mixtures thereof.

28. A fluid for use in a wellbore, the fluid comprising:
a wellbore fluid;
an aqueous additive fluid being miscible with the wellbore fluid and forming a first phase therewith;
a non-toxic, environmentally acceptable capping fluid, in substantially a second phase, being substantially immiscible with the additive fluid and In the wellbore fluid and having a density lighter than the additive fluid and the wellbore fluid for locating adjacent a frost penetration layer adjacent a top of the wellbore; and
additives being dispersible in the additive fluid and the wellbore fluid and substantially immiscible with the capping fluid, the additives being at least a corrosion inhibitor,
wherein the first phase and the second phase are substantially phase separated.

29. The fluid as described in claim 28 further comprising at least one of a scale inhibitor, a salt inhibitor, an oxygen scavenger, a demulsifier and a biocide.

30. The fluid as described in claim 29 wherein the scale inhibitor is a phosphorus containing compound having the general formulae:

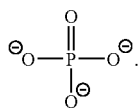

31. The fluid as described in claim 29 wherein the scale inhibitor is selected from the group consisting of aminotrimethylenephosphonic acid, hydroxyethylidene diphosphonic acid, diethylene triamine pentamethylene phosphonic acid, bishexamethylene triaminephosphonic acid, bisarninoethylethanolamine phosphonic acid, and mixtures thereof.

32. The fluid as described in claim 29 wherein the scale inhibitor is a phosphonate having the following structural formulae having the general formulae:

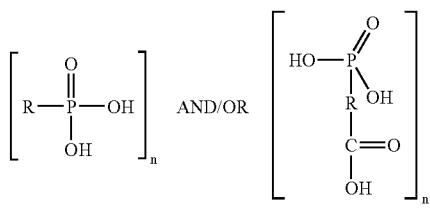

Where: R=H, Alkyl or Aryl and n=integer from 1–10.

33. The fluid as described in claim 29 wherein the salt inhibitor is selected from a group consisting of non-ionic surfactants, demulsifiers glycols, polyglycols, and mixtures thereof.

34. The fluid as described in claim 29 wherein the oxygen scavenger is selected from a group consisting of alkali metal sulphites, alkali-earth metal sulphites, alkali metal bisuiphites, alkali-earth metal bisuiphites, ammonium bisulphite, dimethylhydroxylamine, hydrazine, methyl ethyl ketoxime, and mixtures thereof.

35. The fluid as described in claim 29 wherein the oxygen scavenger is a catalyzed sodium bisulphite.

36. The fluid as described in claim 29 wherein the biocide is selected from a group consisting of bromonitrophenols, phosphonium sulphates, methylchloroisothiazolinone, methylisothiazolinone, hypochlorite ethoxylated amines, ether amines, alkyl aldehydes, aryl aldehydes, primary amines, secondary amines, tertiary amines, quaternary amines, and mixtures thereof.

37. The fluid as described in claim 29 wherein the biocide is tetakishhydroxymethyl phosphonium sulphate.

38. The fluid as described in claim 28 wherein the non-toxic environmentally friendly capping fluid is selected from a group consisting of synthetically cracked hydrocarbons, natural oils, esters, polyalphaolefins, ethers, food-grade paraffins, linear alpha-olefins, glycols, polyglycols, non-toxic silicone oils, minerals oils, linear alcohols, ethoxylated linear alcohols, non-toxic hydrocarbon condensates, fracturing fluids, natural oils, and mixtures thereof.

39. The fluid as described in claim 28 wherein non-toxic environmentally friendly capping fluid is a synthetically cracked hydrocarbon.

40. The fluid as described in claim 28 wherein the corrosion inhibitor is selected from a group consisting of primary, secondary and tertiary amines, fatty acid amides, quaternary ammonium compounds, imidazoines, imidazolium salts, alkylpyridines, long chain fatty acids, salts of long chain fatty acids, and mixtures thereof.

41. The fluid as described in claim 28 wherein the corrosion inhibitor is selected from a group consisting of:

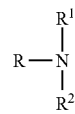

Where R=H, Alkyl or Aryl, $R^1$=H, Alkyl or Aryl, $R^4$, $R^3$, $R^2$=H, Alkyl or Aryl;

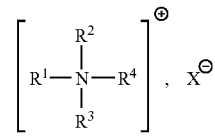

Where $X^-$=balancing anionic salt;

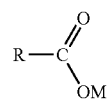

Where M=Alkyl/Aryl alcohol, Alkyl/Aryl Amine or Hydrogen; and

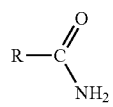

mixtures thereof.

42. A method for treating a cased wellbore containing a wellbore fluid so as to prevent metal corrosion and freezing at a frost penetration layer adjacent a top of the wellbore, the method comprising:
providing an aqueous additive fluid miscible with the wellbore fluid, the additive fluid having additives being dispersible in the additive fluid and the wellbore fluid, the additives being at least a corrosion inhibitor;

dispensing the additive fluid into the wellbore fluid; and placing a non-toxic, environmentally acceptable capping fluid atop the wellbore fluid, the capping fluid being preventing freezing adjacent the frost penetration layer, the capping fluid being substantially immiscible with the additive fluid and in the wellbore fluid and having a density lighter than the additive fluid and the wellbore fluid, wherein the additives in the additive fluid are substantially immiscible with the capping fluid.

43. The method as described In claim 42 wherein the additives further comprise at least one or more of a scale inhibitor, a salt inhibitor, an oxygen scavenger; a non-emulsifier and a biocide.

44. The method as described in claim 42 wherein the non-toxic environmentally acceptable capping fluid is non-aqueous, immiscible with aqueous fluids, has a pour point between −100° C. and 0° C. and a density less than 1.0 g/L.

45. A method for treating an annulus of a cased wellbore containing a wellbore fluid, the method comprising:

providing a packer fluid having, in a first phase, an aqueous additive fluid adapted for addition to a wellbore fluid, the additive fluid being miscible with the wellbore fluid; in substantially a second phase, a non-toxic, environmentally acceptable capping fluid being substantially immiscible with the additive fluid and in the wellbore fluid and having a density lighter than the additive fluid and the wellbore fluid; and additives being dispersible in the additive fluid and the wellbore fluid and substantially immiscible with the capping fluid, the additives being at least a corrosion inhibitor; and dispensing the packer fluid into the wellbore fluid wherein, the additive fluid and additives therein are miscible with the wellbore fluid and the additives are substantially immiscible with the capping fluid: and the capping fluid is substantially immiscible with the additive fluid and the wellbore fluid and lighter than the wellbore fluid for locating the capping fluid at the top of the wellbore adjacent the frost penetration layer, wherein the first phase and the second phase are substantially phase separated.

46. The method as described in claim 45 wherein the additives further comprise at least one or more of a scale inhibitor, a salt inhibitor, an oxygen scavenger; a non-emulsifier and a biocide.

47. The method as described in claim 45 wherein the non-toxic environmentally acceptable capping fluid is non-aqueous, immiscible with aqueous fluids, has a pour point between −100° C. and 0° C. and a density less than 1.0 g/L.

48. A method for treating a cased wellbore comprising:

providing a packer fluid having an aqueous additive fluid, a non-toxic, environmentally acceptable capping fluid being substantially immiscible with the additive fluid and having a density lighter than the additive fluid and additives being dispersible in the additive fluid and substantially immiscible with the capping fluid, the additives being at least a corrosion inhibitor;

dispensing the packer fluid into a wellbore fluid, the additive fluid and additives being miscible in the wellbore fluid for forming a packer fluid/wellbore fluid mixture; and dispensing the packer fluid/wellbore fluid mixture into the casing bore or annulus wherein, the capping fluid is immiscible with the additive fluid and the wellbore fluid and lighter than the wellbore fluid for locating the capping fluid at the top of the wellbore adjacent the frost penetration layer.

49. The method as described in claim 48 wherein the additives further comprise at least one or more of a scale inhibitor, a salt inhibitor, an oxygen scavenger; a non-emulsifier and a biocide.

50. The method as described in claim 48 wherein the non-toxic environmentally acceptable capping fluid is non-aqueous, immiscible with aqueous fluids, has a pour point between −100° C. and 0° C. and a density less than 1.0 g/L.

51. A kit for treating a cased wellbore containing wellbore fluid, comprising the following components provided in a packaged form:

a first fluid comprising in a first phase, an aqueous additive fluid and additives in a first package, the additives being dispersible in the additive fluid and the wellbore fluid, the additives being at least a corrosion inhibitor; and a second, non-toxic, environmentally acceptable capping fluid, in substantially a second phase, in a second package being substantially immiscible with the additive fluid and having a density lighter than the additive fluid for locating adjacent a frost penetration layer adjacent a top of the wellbore, wherein, the additives are miscible in the wellbore fluid and substantially immiscible with the capping fluid, wherein the first phase and the second phase are substantially phase separated.

52. The kit as described in claim 51 wherein the additives further comprise at least one or more of a scale inhibitor, a salt inhibitor, an oxygen scavenger; a non-emulsifier and a biocide.

53. The kit as described in claim 51 wherein the non-toxic environmentally acceptable capping fluid is non-aqueous, immiscible with aqueous fluids, has a pour point between −100° C. and 0° C. and a density less than 1.0 g/L.

54. A kit for treating a wellbore to prevent metal corrosion and freezing at a frost penetration layer adjacent a top of the wellbore, the components provided in a unitary packaged form, comprising:

in a first phase, an aqueous additive fluid adapted for addition to a wellbore fluid; and a non-toxic, environmentally acceptable capping fluid in substantially a second phase, being substantially immiscible with the additive fluid and the wellbore fluid, the additive fluid and capping fluid having different densities, the capping fluid having a density lighter than the additive fluid for locating adjacent the frost penetration layer, the additive fluid being miscible with the wellbore fluid; and additives, being at least a corrosion inhibitor; the additives being dispersible within the additive fluid and the wellbore fluid, the additives in the additive fluid further being substantially immiscible with the capping fluid, wherein the first phase and the second phase are substantially phase separated.

55. The kit as described in claim 54 wherein the additives further comprise at least one or more of a scale inhibitor, a salt inhibitor, an oxygen scavenger, a non-emulsifier and a biocide.

56. The kit as described in claim 54 wherein the non-toxic environmentally acceptable capping fluid is non-aqueous, immiscible with aqueous fluids, has a pour point between −100° C. and 0° C. and a density less than 1.0 g/L.

* * * * *